United States Patent Office 3,814,817
Patented June 4, 1974

3,814,817
PROCESS FOR CURING DRY AND SEMI-DRY SAUSAGES
Charles W. Everson, Warren, Wilson E. Danner, Linden, and Paul A. Hammes, Westfield, N.J., assignors to Merck & Co., Inc., Rahway, N.J.
No Drawing. Continuation-in-part of applications Ser. No. 52,718, July 6, 1970, Ser. No. 207,574, Dec. 13, 1971, and Ser. No. 257,870, May 30, 1972, all now abandoned. This application Aug. 6, 1973, Ser. No. 385,788
Int. Cl. A22c 11/00
U.S. Cl. 426—56
6 Claims

ABSTRACT OF THE DISCLOSURE

An improved process for preparing dry and semi-dry sausages using *Lactobacillus plantarum* NRRL–B–5461 either alone or with other lactic acid producing microorganisms. The process can be effected in the presence or absence of glutamic acid in the meat mixture.

CROSS-REFERENCE TO RELATED APPLICATIONS

This application is a continuation-in-part of our copending application Ser. No. 257,870, filed May 30, 1972 now abandoned, and applications Ser. No. 207,574, filed Dec. 13, 1971, now abandoned, and Ser. No. 52,718, filed July 6, 1970, now abandoned.

This invention relates to the production of dry or semi-dry sausages and particularly to the formation of a favorable processing environment to reduce the time required to obtain the desired fermentation and to obtain an improved product.

Dry and semi-dry sausages are distinguished from other sausage types in that the comminuted meat mixture with added edible nitrite and an enediol reducing agent, which may or may not first be cured, is placed in casings and they are then processed by carefully controlled air drying. They may be given a light preliminary smoke but the essential feature is the long, continuous, air drying process. They differ, therefore, from other types which are classified as fresh sausages, smoked sausages, cured sausages, cooked sausages and the so-called new condition sausage.

The essential feature of the dry and semi-dry sausages with which this invention is concerned is that fermentation takes place in the product during the drying step. This fermentation is due to the growth of organisms which are introduced into the meat from one or more sources. The organisms may include some which unavoidably become mixed into the meat as it is being ground and mixed with curing and spice agents, or the organisms may be in a small portion taken from a previously made sausage, but in the present instance the fermentation organism is deliberately added from a known culture strain or strains.

A commonly used starter strain is the bacterium *Pediococcus cerevisiae*, also known as *Pediococcus acidilacti*, because it produces large amounts of lactic acid which gives the final sausage is characteristic tang. This bacterium is commercially obtainable both in a frozen state and in a lyophilized state and it is also obtainable in an active growing condition from culture repositories. Other bacteria which may be used are members of the Lactobacillaceae family of bacteria, especially those known to be good producers of lactic acid, such as *Lactobacillus plantarum*, *Leuconostoc citrovorum*, *Streptococcus lactis* and *Streptococus diacetilactis* and their combinations.

One especially effective strain of *Lactobacillus plantarum* NRRL–B–5461 is useful because of its ability to grow at lower temperatures as, for example, in the range of 50°–85° F. and to rapidly produce lactic acid as shown by the lower pH values. When this particular strain is employed in the manufacture of dry or semi-dry sausage, either alone or in combination with *Pediococcus cerevisiae* and/or one or more of the above-mentioned strains, a broad range of fermentation temperatures is made available. This allows the sausage manufacturer to produce products having distinct and characteristic flavor quickly and with good reproducibility. It also tends to reduce the growth of undesirable contaminating microorganisms.

The dry and semi-dry sausages vary according to the meat source, i.e., pork, beef, veal, etc. and their different mixtures, and the sugar and spices used. The fairly distinct categories are known as summer sausage, cervelat of various kinds such as Allesandri and German, and various kinds of Italian sausage such as Pepperoni and Cappicola. There are other dry and semi-dry sausages having their origin in the geographical areas such as France and Spain and which are benefited by the present invention.

In making these dry and semi-dry sausages, a special problem is present which does not arise in making sausages of the other classifications such as fresh and cured sausages. The problem concerns development of methods to maintain the desirable natural cure color of the meat, to avoid contamination of the sausage by undesirable organisms and to avoid excessively high cure temperatures with resultant deleterious effect on flavor and color.

One method of solving the problem is the production of a low pH during the air-drying step in which fermentation occurs, this step being unique to the dry and semi-dry sausage as there is no such step in the making of other types of sausage. The relatively low pH should occur quickly in this fermentation stage for two reasons; first, to reduce the rate of growth of undesirable, contaminating organisms, and second, to maintain the desirable, natural cure coloring. When it is considered that the drying period may be from one day to six months, the importance of achieving these two desiderata will be understood.

In accordance with this invention, it is found that the fermentation of meat mixtures in the preparation of dry and semi-dry sausages is improved by using *Lactobacillus plantarum* NRRL–B–5461 as the source of the lactic acid producing organism. The use of this microorganism in preparing such sausages is advantageous since it permits the use of low curing temperatures in the range of 50°–85° F., thereby minimizing the development of undesirable bacterial contaminants and accelerates the curing of the sausages.

In accordance with a further embodiment of our invention, it is found that it is particularly advantageous to utilize a combination of *Lactobacillus plantarum* NRRL-B–5461 and a second lactic acid producing organism from the group consisting of *Pediococcus cerevisiae*, *Leuconostoc citrovorum*, *Streptococcus lactis* and *Streptococcus diacetilactis* since this permits the use of a wider range of temperatures in the sausage fermentation step. In particular, it is preferred to use a mixture of approximately equal amounts of *Pediococcus cerevisiae* and *Lactobaccillus plantarum* NRRL–B–5461 since each organism is able to maintain substantially maximum growth without adversely affecting the growth of either organism.

In accordance with a further embodiment of the present invention, it has been found that added glutamic acid produces the relatively low pH desired in the fermentation step. The internal meat temperature of the fermentation step, i.e. 55–80° F. for dry sausage and 80–110° F. for semi-dry sausage, causes the glutamic acid to go into solution and assert its acidic properties. Prior to this fermentation step the meat is kept within a 34° to 38° F. temperature. At that low temperature, approaching the freezing point, very little of the glutamic acid goes in solution and consequently it does not bring about an acidic condition.

The invention takes advantage of the little known fact that glutamic acid is only slightly soluble in 32° F. water but is quite soluble in 212° F. water. Most chemical dictionaries make no mention of the greatly increasing solubility of glutamic acid in water as its temperature is increased. The striking temperature-related solubility is set forth in the data on p. C–669 of the *Handbook of Chemistry and Physics* published by the Chemical Rubber Co. From the figures given there, the following data may be interpolated with respect to the temperatures involved in this invention and the solubility in grams per 100 milliliters.

| Degrees Fahrenheit | 34 | 38 | 55 | 80 | 110 |
|---|---|---|---|---|---|
| DL-glutamic acid | 0.86 | 0.90 | 1.2 | 2.3 | 3.7 |
| L-glutamic acid | 0.35 | 0.37 | 0.5 | 0.9 | 1.7 |

In this table, both DL-glutamic acid and L-glutamic acid are listed as either one may be used. The L-glutamic acid is preferable as much of its seems to be converted in the sausage mixture to a salt form and this imparts its flavor enhancing effect to the final product much like that of monosodium glutamate (MSG). The racemic DL mixture may be preferred under certain conditions and, if it is used, a sufficient amount should be measured out to supply from 50% to 100% of the amount of the L form which is hereinafter called for.

In practicing the invention, from 2 to 16 ounces of L-glutamic acid are added per 100 pounds of meat mix. It is mixed into the chopped meat separately from or along with the other added agents such as sugar, spices and curing ingredients. In our Pat. 3,738,842, issued June 12, 1973, we disclose the addition of glutamic acid to cured sausages and the like as distinct from the present dry or semi-dry sausages. That patent application discloses the importance of glutamic acid in the curing step but it has no relationship to a fermentation step, as this stage is lacking. The present invention involves the discovery that glutamic acid is unexpectedly valuable in the air-drying stage which is utilized only in making dry and semi-dry sausage.

The conventional steps of making sausages of this type are carried out. Thus, the proper selection of a single meat or different meats is carried out and they are chopped and mixed either separately or together. The glutamic acid may be added at any part of this step or it may not be added until the subsequent step which is that of adding and mixing the curing agents, sugar and spices. This selection and the relative amounts conform to standard practices. Also, the lactic acid-producing organism or organisms are added during this time, if a starter culture is being used.

In a preferred method of carrying out the process of this invention without the addition of glutamic acid, a culture of *Lactobacillus plantarum* NRRL-B-5461 in an amount between 0.1% and 1.0% based on the weight of the meat, said culture containing from $10^8$ to $10^{10}$ viable cells per milliliter of *Lactobacillus plantarum* culture concentrate, is added to the meat mixture as soon as it is ground. Sausage prepared in this manner is preferably fermented at a temperature of 65–75° F. for periods of from 5–15 hours and, if it is desired to produce a distinctive flavor, may be fermented at temperatures of up to 85° F.

Another preferred method in accordance with the present invention involves the incorporation of a mixed culture of *Pediococcus cerevisiae* and *Lactobacillus plantarum* NRRL-B-5461, each culture being present in approximately equal amounts. Thus, a culture concentrate which contains approximately $10 \times 10^9$ cells/ml. of *Pediococcus cerevisiae* and $20 \times 10^9$ cells/ml. of *Lactobacillus plantarum* is preferred, and the culture concentrate is added to the meat in an amount between 0.1% and 1.0% based on the weight of the meat. Culture concentrates are preferred as disclosed in U.S. Pat. No. 3,561,977 of Rothchild et al., entitled "Process of Making Sausage." A suitable growth medium for *Lactobacillus plantarum* follows:

LACTOBACILLUS PLANTARUM GROWTH MEDIUM

[One liter of medium—24 hours at 37° F.]

| | Amount in grams |
|---|---|
| Trypticase (enzymatic hydrolysate of peptone) | 10.00 |
| Yeast extract | 7.50 |
| Sodium chloride | 5.00 |
| Potassium phosphate | 5.00 |
| Sodium citrate | 5.00 |
| Dextrose | 10.00 |
| Polysorbate "80" (a polyoxyethylene derivative of a fatty acid; partial ester of sorbitol anhydride) | 0.20 |
| $MgSO_4$ | 0.80 |
| Manganous chloride | 0.14 |
| Ferrous sulfate | 0.04 |
| Sodium carbonate | 1.25 |

Water to make 1.0 liters.

If the meat mixture is to be cured before it is fermented the curing may follow established procedures and this involves keeping the preparation at a 36° to 38° F. temperature for two to three days to allow the nitrites and/or nitrates to undergo chemical reduction and yield the nitric oxide which effects the cure. This temperature represents another departure from that for cured sausages and the like, as with these latter a high temperature of 175° to 195° F. is used to obtain a quick cure. At the low curing temperature of 34° to 38° F. for dry and semi-dry sausages only a small amount of glutamic acid goes in solution and consequently it has a minor influence so that the meat is at a pH of 5.8 to 6.0.

Then this cured meat preparation is stuffed in the casing which is traditionally associated with the particular type of dry or semi-dry sausage. The encased sausage may or may not be smoked depending on its particular type and the conventional practice.

If a lactic acid starter culture is being used the pre-curing (the so-called pan-curing) step is eliminated and the sausage mixture is stuffed directly into suitable casings.

If the specific product being made is a "dry" sausage, the sausages are hung in drying rooms in which fermentation takes place within the sausage. The rooms are kept at a 55° to 80° F. temperature and a 65–80% relative humidity, as is characteristic for that product and to assure that the sausage will dry from the inside outward. At the higher temperature of the drying room, the glutamic acid goes into solution and when this occurs it brings about a rapid lowering of the pH to about 5.0 to 5.5. Under this acidic condition the lactic acid producing organisms undergo rapid growth or fermentation, and at the same time the contaminating organisms that cannot tolerate these conditions of pH and temperature are killed or their growth is inhibited.

The rapid fermentation by the lactic acid producing organism and the accelerated release of the lactic acid causes a quicker development of the desired tang. Consequently, the drying period is materially shortened, in fact in some instances it may be halved.

If the specific product is a "semi-dry" sausage, the sausages would be moved into a smoke house or other suitable room or cabinet and are warmed, with or without an intermediate "tempering" period, to 80–110° F. internal temperature with relatively high humidities, i.e., 75–95% relative humidity. In this temperature range, the added glutamic acid will dissolve and drop the pH within a very short time resulting in control of acid-intolerant organisms, which includes many of the pathogenic contaminants commonly found in or on fresh meats. The fermentation period may extend from 12 to 24 hours, on one hand, to 72 to 240 hours on the other. Smoke may be applied during all, part or none of this fermentation period, again depending upon the nature of the specific product being produced. The use of glutamic acid, by producing a rapid, initial pH drop, materially shortens the total time required for the lactic acid bacteria to produce the desired final pH which may range from 4.5 to 5.2, depending upon the specific product.

Following the contemporary practice of using a lactic acid bacteria starter culture, the sausage mixture is made as above but the curing step is omitted and it is immediately stuffed into casings and moved directly to the drying room or smoke house. Here the temperature is high enough to permit the glutamic acid to dissolve and effect an immediate reduction to the pH range mentioned above. Under these conditions, many undesirable contaminant microorganisms will be effectively inhibited and the lactic acid bacteria will be stimulated to grow and produce lactic acid. Fermentation times will range from 6 to 24 hours when glutamic acid is used in conjunction with a "starter culture."

The degree of quality control permitted by this invention results in an unprecedented high order of uniformity of color, flavor and yield from batch to batch of sausage, and the process time required is generally only a fraction of the time required to make the same type of sausage via the traditional process.

Representative examples are the following.

EXAMPLE 1

Thuringer cervelat

Basic formulae for Thuringer are:

| Formula No. 1: | Lbs. |
| --- | --- |
| Beef trimmings | 75 |
| Pork or beef hearts | 15 |
| Ham fat | 10 |
| Formula No. 2: | |
| Beef trimmings | 90 |
| Ham fat or other low-priced pork fats | 10 |

Thuringer cervelat is a semi-dry summer sausage which is becoming increasingly popular. The beef, fat and hearts, if used, are ground through a ½ inch plate, mixed, reground through a ⅛ inch plate, and mixed with a curing and spice mixture consisting of 3 lbs. of salt, 2½ ounces of sodium nitrate, 12 ounces of sugar, and 8 ounces of pepper. Approximately 4 to 8 ounces of a culture concentrate of Lactobacillus plantarum NRRL-B-5461 containing between $10^8$-$10^{10}$ cells/ml. of concentrate is then mixed into the meat. Some packers also include other spices such as coriander, anise, nutmeg and mustard. From 2 to 16 ounces of glutamic acid may or may not be added and mixed into the meat preparation. The mixture is then compacted well in pans 8 inches deep and placed in a curing cellar held at 36° to 38° F. It is left in cure from 48 to 72 hours. The temperature of the meat should never exceed 55° F. after being ground.

The meat is next removed from the pans and remixed. At this time from 2 to 16 ounces of glutamic acid is included in the mixing if it has not been added prior to the curing step. It is then stuffed tightly in export hog bungs or sewed hog bungs 30 inches long and 2½ to 2¾ inches in diameter. Every effort is made to avoid air pockets while stuffing the sausage. The casings are punctured after being stuffed to permit entrapped air to escape.

When the price of pork trimmings is relatively cheap as compared with beef trimmings, they are often substituted in part for the latter.

The stuffed sausage is hung in the drying room for 24 to 48 hours at a temperature of 55° F. When the sausage has become firm and has acquired a good color, it is placed in a smokehouse at a temperature of 65°-75° F. and smoked up to 48 hours. The smokehouse is warmed up gradually to 100° F. After the sausage has been smoked, it is cooled to room temperature and is then ready for shipment. The sausage will be rich in lactic acid and have the desired tang.

EXAMPLE 2

Thuringer cervelat

Basic formulae for Thuringer are:

| Formula No. 1: | Lbs. |
| --- | --- |
| Beef trimmings | 75 |
| Pork or beef hearts | 15 |
| Ham fat | 10 |
| Formula No. 2: | |
| Beef trimmings | 90 |
| Ham fat or other low-priced pork fats | 10 |

Thuringer cervelat is a semi-dry summer sausage which is becoming increasingly popular. The beef, fat and hearts, if used, are ground through a ½ inch plate, mixed, reground through a ⅛ inch plate, and mixed with a curing and spice mixture consisting of 3 lbs. of salt, 2½ ounces of sodium nitrate, 12 ounces of sugar, and 8 ounces of pepper. Approximately 12 ounces of dextrose, 4-8 ounces of a mixed culture concentrate containing about $10 \times 10^9$ cells/ml. of a culture concentrate of Pediococcus cerevisiae and about $20 \times 10^9$ cells/ml. of a culture concentrate of Lactobacillus plantarum NRRL-B-5461 is then mixed into the meat. Some packers also include other spices such as coriander, anise, nutmeg and mustard. From 2 to 16 ounces of glutamic acid may or may not be added and mixed into the meat preparation. The mixture is then compacted well in pans 8 inches deep and placed in a curing cellar held at 36° to 38° F. It is left in cure from 48 to 72 hours. The temperature of the meat should never exceed 55° F. after being ground.

The meat is next removed from the pans and remixed. At this time from 2 to 16 ounces of glutamic acid is included in the mixing if it has not been added prior to the curing step. It is then stuffed tightly in export hog bungs or sewed hog bungs 30 inches long and 2½ to 2¾ inches in diameter. Every effort is made to avoid air pockets while stuffing the sausage. The casings are punctured after being stuffed to permit entrapped air to escape.

When the price of pork trimmings is relatively cheap as compared with beef trimmings, they are often substituted in part for the latter.

The stuffed sausage is hung in the drying room for 24 to 48 hours at a temperature of 55° F. When the sausage has become firm and has acquired a good color, it is placed in a smokehouse at a temperature of 65°-75° F. and smoked up to 48 hours. The smokehouse is warmed up gradually to 110° F. After the sausage has been smoked, it is cooled to room temperature and is then ready for shipment. The sausage will be rich in lactic acid and have the desired tang.

EXAMPLE 3

Thuringer cervelat

Basic formulae for Thuringer are:

| Formula No. 1: | Lbs. |
| --- | --- |
| Beef trimmings | 75 |
| Pork or beef hearts | 15 |
| Ham fat | 10 |
| Formula No. 2: | |
| Beef trimmings | 90 |
| Ham fat or other low-priced pork fats | 10 |

Thuringer cervelat is a semi-dry summer sausage which is becoming increasing popular. The beef, fat and hearts, if used, are ground through a ½ inch plate, mixed, reground through a ⅛ inch plate, and mixed with a curing and spice mixture consisting of 3 lbs. of salt, 2½ ounces of sodium nitrate, 12 ounces of sugar, and 8 ounces of pepper. Approximately 12 ounces of dextrose and 4-8 ounces of a mixed culture concentrate containing Lactobacillus plantarum NRRL-B-5461 and Leuconostoc citrovorum, each present in the amount of about $10^8$ to $10^{10}$ cells/ml. of concentrate, is then mixed into the meat.

Some packers also include other spices such as coiander, anise, nutmeg and mustard. From 2 to 16 ounces of glutamic acid may or may not be added and mixed into the meat preparation. The mixture is then compacted well in pans 8 inches deep and placed in a curing cellar held at 36° to 38° F. It is left in cure from 48 to 72 hours. The temperature of the meat should never exceed 55° F. after being ground.

The meat is next removed from the pans and remixed. At this time from 2 to 16 ounces of glutamic acid is included in the mixing if it has not been added prior to the curing step. It is then stuffed tightly in export hog bungs or sewed hog bungs 30 inches long and 2½ to 2¾ inches in diameter. Every effort is made to avoid air pockets while stuffing the sausage. The casings are punctured after being stuffed to permit entrapped air to escape.

When the price of pork trimmings is relatively cheap as compared with beef trimmings, they are often substituted in part for the latter.

The stuffed sausage is hung in the drying room for 24 to 48 hours at a temperature of 55° F. When the sausage has become firm and has acquired a good color, it is placed in a smokehouse at a temperature of 65°–75° F. and smoked up to 48 hours. The smokehouse is warmed up gradually to 100° F. After the sausage has been smoked, it is cooled to room temperature and is then ready for shipment. The sausage will be rich in lactic acid and have the desired tang.

EXAMPLE 4

Pepperoni sausage

A standard formula for pepperoni sausage is:

|  | Percent |
|---|---|
| Lean pork trimmings | 50 |
| Regular frozen pork trimmings | 20 |
| Boneless chucks | 30 |

*Seasoning for 100 lbs. of meat:*

| Salt | 3 lbs., 6 oz. |
|---|---|
| Granulated sugar | 4 oz. |
| Sodium nitrate | 2 oz. |
| Cayenne pepper | 8 oz. |
| Pimento | 8 oz. |
| Whole aniseed | 4 oz. |
| Peeled garlic | ½ oz. |
| Pepperoni pepper | 1 lb. |

Pepperoni sausage is named from the pepper content of its spicing. The product is coarsely cut. The proper proportions of pork and beef are weighed out, ground through a ⅛ inch plate and mixed with the curing ingredients, 12 ounces of dextrose, spices, and 8 ounces of a mixed culture concentrate of *Pediococcus cerevisiae* and *Lactobacillus plantarum* NRRL-B-5461. From 2 to 16 ounces of glutamic acid may or may not be added to this mixture. The meat is cured in pans 6 inches deep for 48 hours at a temperature of 38° F., stuffed into pork casings and twin-linked in pieces 10 to 12 inches long. A little meat is stripped from the broken end of each casing so that there will be about ½ inch of casing left to fold up against the side of the sausage. The linked sausage is hung in dry rooms for 12 to 24 hours at a temperature of 80 to 100° F. It will have a desirable tangy taste.

EXAMPLE 5

Italian salami

The following is a standard formula for Italian salami:

|  | Lbs. |
|---|---|
| Boneless chucks | 20 |
| Lean pork frozen shoulder trimmings | 48 |
| Back fat frozen pork trimmings | 20 |
| Shoulder fat | 12 |

Spices:

| Salt | 3 lbs., 6 oz. |
|---|---|
| White pepper | 2 oz. |
| Whole pepper | ½ oz. |
| Saltpeter | 1 oz. |
| Garlic | 1 oz. |

To 900 pounds of this sausage is added the following additional seasoning:

| Pure white gelatin | lbs. | ¼ |
|---|---|---|
| Fresh red wine | qts. | 2 |
| Whole nutmeg |  | 1 |
| Cloves | oz. | 1¼ |
| Cinnamon | oz. | ½ |

The gelatin, nutmeg and cinnamon are placed in a bag and cooked with the wine for 10 to 15 minutes just below the boiling point. The wine is then strained and cooled. When cool, it—together with the curing material, pepper and garlic—is mixed thoroughly with the meat after the beef has been ground through a ⅛ inch plate, and the pork through a ½ inch plate. Mixed into this is 12 ounces of dextrose and 8 ounces of a starter culture concentrate of *Lactobacillus plantarum* NRRL-B-5461. The meat is stuffed into hog bungs. The stuffed sausage is hung in the green dry room for 36 hours to dry. After the casing has been dried, the stuffed product is wrapped with 4 lb. flax twine commencing at the small end, making a hitch of the twine every half-inch the whole length of the sausage to the top end. The sausage is then hung in a dry room at a temperature 50° F. for 2–3 days.

EXAMPLE 6

Italian salami

The following is a standard formula for Italian salami:

|  | Lbs. |
|---|---|
| Boneless chucks | 20 |
| Lean pork frozen shoulder trimmings | 48 |
| Back fat frozen pork trimmings | 20 |
| Shoulder fat | 12 |

Spices:

| Salt | 3 lbs., 6 oz. |
|---|---|
| White pepper | 2 oz. |
| Whole pepper | ½ oz. |
| Saltpeter | 1 oz. |
| Garlic | 1 oz. |

To 900 pounds of this sausage is added the following additional seasoning:

| Pure white gelatin | lb. | ¼ |
|---|---|---|
| Fresh red wine | qts. | 2 |
| Whole nutmeg |  | 1 |
| Cloves | oz. | 1¼ |
| Cinnamon |  | ½ |

The gelatin, nutmeg and cinnamon are placed in a bag and cooked with the wine for 10 to 15 minutes just below the boiling point. The wine is then strained and cooled. When cool, it—together with the curing material, pepper, and garlic—is mixed thoroughly with the meat after the beef has been ground through a ⅛ inch plate and the pork through a ½ inch plate. Mixed into this is 12 ounces of lactose and 4–8 ounces of a starter culture containing from $10^8$ to $10^{10}$ cells/ml. of *Lactobacillus plantarum* NRRL-B-5461 and $10^8$ to $10^9$ cells/ml. of *Pediococcus cerevisiae*. The meat is stuffed into hog bungs. The stuffed sausage is hung in the green dry room for 36 hours to dry. After the casing has been dried, the stuffed product is wrapped with 4 lb. flax twine commencing at the small end, making a hitch of the twine every half-inch the whole length of the sausage to the top end. The sausage is then hung in a dry room at a temperature of 50° F. for 2–3 days.

A culture of the *Lactobacillus plantarum* strain with which this invention is concerned has been irrevocably deposited in the permanent culture collection of the Northern Regional Research Laboratories of the Department of Agriculture at Peoria, Ill., where it is available to anyone under the ascension number NRRL-B-5461.

*Lactobacillus plantarum* NRRL-B-5461 has the following morphological and cultural characteristics:

General description—Gram positive, non-motile, rods, ordinarily 0.6–0.8 μm. by 1.2–1 to 6 μm., occurring singly or in short chains
Catalase—Negative
Temperature relationship—Does not grow at either 7° C. or 45° C.
Does not survive for 30 minutes at 63° C.
Salt tolerance—Develops in >9% salt
Glucose fermented to lactic acid, no gas is formed (homofermentative)
Type of lactic acid—DL
Acid in milk—Less than 1% (0.011%)
Carbohydrate fermentation characteristics:

Fermented:
  Arabinose±
  Rhamnose, weakly
  Fructose
  Glucose
  Galactose
  Sucrose
  Trehalose
  Maltose
  Cellobiose
  Lactose
  Melizitose
  Dextrin
  Sorbitol
  Mannitol
  α-Methyl-d-glucoside±
  Glycerol
  Melibiose
Did not ferment:
  Xylose
  Sorbose
  Dulcitol
  Raffinose
  Adonitol
  Mannose
  Amygdalin
  Salicin
  Starch±

| Test or fermentation: | Reaction |
|---|---|
| Acetate | |
| Citrate | |
| Lactate | |
| Ethanol | |
| Blood agar | Growth, no hemolysis. |
| Litmus milk | Acid coagulation, reduced. |
| Arginine hydrolysis | |
| Esculin hydrolysis | +. |
| Gelatin hydrolysis | |
| Starch hydrolysis | |

Moles percent GC content: [$T_m = 87.25$] 43.6.

The NRRL-B-5461 strain of *Lactobacillus plantarum* was compared with a known strain of this microorganism obtained from the American Type Culture Collection where it is included as culture ATCC-14917 (Orla-Jensen). Both of the microorganisms were grown under the same conditions in the same culture medium and the cells were recovered from the resulting fermentation broth by centrifugation in the cold. The centrifuged cells were washed in distilled water and suspended in water; the concentration of the viable cell density of each of the suspensions being adjusted to the same concentration of about $5.5 \times 10^9$ cells/ml. These cells were then used to inoculate a meat mixture prepared as described below:

Sausage formulation:
| | | |
|---|---|---|
| Beef chunk | lb | 30 |
| Butts | lb | 20 |
| Salt | g | 681.0 |
| Sodium nitrite | g | 1.75 |
| Sodium nitrate | g | 1.75 |
| Dextrose | g | 175.0 |
| Grnd. black pepper | g | 88.0 |
| Grnd. nutmeg | g | 8.8 |
| Grnd. mustard | g | 8.8 |
| Grnd. allspice | g | 8.8 |
| Grnd. cloves | g | 4.4 |
| Grnd. cinnamon | g | 4.4 |
| Sodium isoascorbate | g | 12.4 |

The meat mixture was prepared by chopping the meat, curing agents, salt and spices in a Kramer-Grebe Vacuum Cutmix. A 10½ lb. portion of the meat emulsion so obtained was used as the "control." The remainder of the emulsion was split into two equal portions. One of these portions was inoculated with 48 ml. of the NRRL-B-5461 cell suspension and the second with 48 ml. of the ATCC-14917 cell suspension which were prepared as described above. After thorough mixing with the meat mix, the mixtures and the control mixture were stuffed into 1 lb. polyethylene bags. The resulting chubs were divided and placed in 65° F. and 100° F. water baths for fermentation. The chubs were removed from the baths periodically and the pH of the sausage mixtures was determined. The results are shown in the following tables:

pH OF THE SAUSAGES AGED AT 65° F.

| | | L. plantarum | |
|---|---|---|---|
| | Control | NRRL-B-5461 | ATCC-14917 |
| Days: | | | |
| 1 | 5.80 | 5.75 | 5.75 |
| 2 | 5.80 | 5.68 | 5.75 |
| 3 | 5.55 | 5.20 | 5.45 |
| 4 | 5.22 | 4.60 | 4.85 | pH OF THE SAUSAGES AGED AT 100° F.

| | | L. plantarum | |
|---|---|---|---|
| | Control | NRRL-B-5461 | ATCC-14917 |
| Hours: | | | |
| 0 | 5.80 | 5.80 | 5.80 |
| 7 | 5.83 | 5.80 | 5.85 |
| 17 | 5.88 | 5.13 | 5.75 |
| 21 | | 4.60 | 5.20 |
| 24 | 5.85 | 4.45 | 5.10 |
| 41 | | 4.45 | 4.53 |

Thus, in each of the foregoing tests the sausage mixtures inoculated with *Lactobacillus plantarum* NRRL-B-5461 developed a lower pH in a shorter time than those inoculated with the ATCC-14917 culture.

We claim:

1. In the process of making dry and semi-dry sausage including the steps of inoculating and fermenting meat mixtures with lactic acid producing microorganisms, the improvement which comprises using *Lactobacillus plantarum* NRRL-B-5461 in the form of a culture concentrate containing from $10^8$ to $10^{10}$ viable cells per milliliter in an amount between 0.1 and 10% based on the weight of the meat as the lactic acid producing microorganism.

2. The process of claim 1 wherein glutamic acid in an amount between 2 and 16 ounces per 100 pounds of meat mixture is added.

3. The process of making dry and semi-dry sausage including the steps of inoculating and fermenting a meat mixture with lactic acid producing microorganisms, the improvement which comprises using a mixture of *Lactobacillus plantarum* NRRL-B-5461 in the form of a culture concentrate containing from $10^8$ to $10^{10}$ viable cells per milliliter in an amount between 0.1 and 1.0% based on the weight of the meat and a second microorganism from the group consisting of *Pediococcus cerevisiae, Leuconostoc citrovorum, Streptococcus lactis* and *Streptococcus diacetilactis* as the lactic acid producing microorganism.

4. The improved process of claim 3 in which the added lactic acid elaborating microorganisms are *Lactobacillus plantarium* NRRL-B-5461 and *Pediococcus cerevisiae*.

5. The process of claim 3 in which the added lactic acid elaborating microorganisms are *Lactobacillus plantarum* NRRL-B-5461 and *Leuconostoc citrovorum*.

6. The process of claim 3 wherein glutamic acid in an amount between 2 and 16 ounces per 100 pounds of meat is added to the meat mixture.

References Cited
UNITED STATES PATENTS

| | | | |
|---|---|---|---|
| 2,225,783 | 12/1940 | Jensen et al. | 426—59 |
| 2,687,356 | 8/1954 | Fraticelli | 426—315 |
| 2,907,661 | 10/1959 | Niven et al. | 426—59 |
| 3,561,977 | 2/1971 | Rothchild et al. | 426—59 |

HYMAN LORD, Primary Examiner

U.S. Cl. X.R.

426—59

PO-1050
(5/69)

UNITED STATES PATENT OFFICE
CERTIFICATE OF CORRECTION

Patent No. 3,814,817          Dated June 4, 1974

Inventor(s) Everson, Danner, & Hammes

It is certified that error appears in the above-identified patent and that said Letters Patent are hereby corrected as shown below:

Page 10, line 69     Claim 1

Should read: between 0.1 and 1.0% based on the weight instead of: between 0.1 and 10% based on the weight.

Signed and sealed this 19th day of November 1974.

(SEAL)
Attest:

McCOY M. GIBSON JR.
Attesting Officer

C. MARSHALL DANN
Commissioner of Patents